United States Patent [19]

Basler et al.

[11] 4,221,358

[45] Sep. 9, 1980

[54] POSITIVE CLAPPER OUTLET VALVE

[75] Inventors: Glennon L. Basler; Richard J. Wempe, both of St. Charles, Mo.

[73] Assignee: ACF Industries, Incorporated, New York, N.Y.

[21] Appl. No.: 32,996

[22] Filed: Apr. 25, 1979

[51] Int. Cl.³ .................. F16K 31/50; F16K 51/00
[52] U.S. Cl. ..................................... 251/144; 137/797
[58] Field of Search ............... 251/144; 137/797, 350

[56] References Cited

U.S. PATENT DOCUMENTS

| | | | |
|---|---|---|---|
| 1,604,712 | 10/1926 | Nordstrom et al. | 251/144 X |
| 2,257,212 | 9/1941 | Willoughby | 251/144 X |
| 3,981,481 | 9/1976 | Reedy et al. | 251/144 |
| 4,180,242 | 12/1979 | Reedy | 251/144 |

FOREIGN PATENT DOCUMENTS 649825  10/1962  Canada ........................... 137/797

*Primary Examiner*—William R. Cline
*Attorney, Agent, or Firm*—Henry W. Cummings

[57] ABSTRACT

In accordance with the present invention, a top operated tank car valve assembly includes a rod extending downwardly from the top of the tank and is attached to a valve stem of a lading valve closure located in the bottom of the tank. A valve seat for a valve closure is located in an opening in the bottom outlet mounting flange. A valve guide depends from the valve closure. The valve guide includes a center hub and a plurality of vanes extending radially outwardly therefrom and adapted to engage the valve cage as the valve is moved between open and closed positions. The center hub is hollow and is adapted to receive a fastener to attach the valve guide to the valve closure. The fastener includes a threaded inner end to engage the lower portion of the valve closure. A non-round horizontal plate is welded to the fastener which holds a seal retainer in engagement with a seal and the valve closure. A breakage groove is provided in the fastener below the non-round horizontal plate which aligns with the upper surface of the valve guide. An outlet chamber is attached to the tank mounting flange with shearable fasteners. The breakage groove aligns with the mounting flange and outlet chamber interface. If the outlet chamber is impacted, the outlet chamber fasteners and valve guide fastener will shear along a common plane and the outlet chamber and valve guide will be separated from the outlet. However, the non-round horizontal plate located above the shear plane will maintain the seal retainer and the closure seal in place on the valve seat. Thus lading will be prevented from escaping from the tank during such impacts.

5 Claims, 5 Drawing Figures

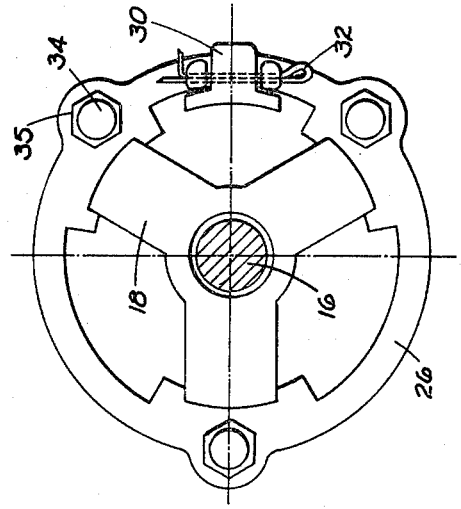
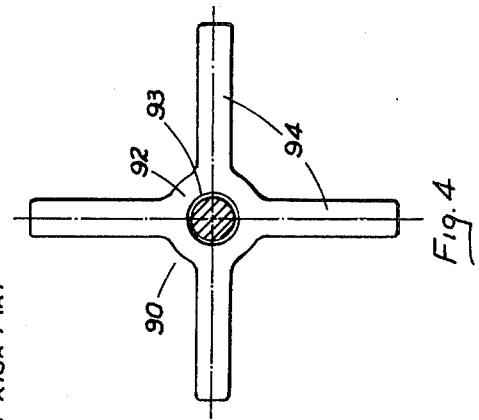
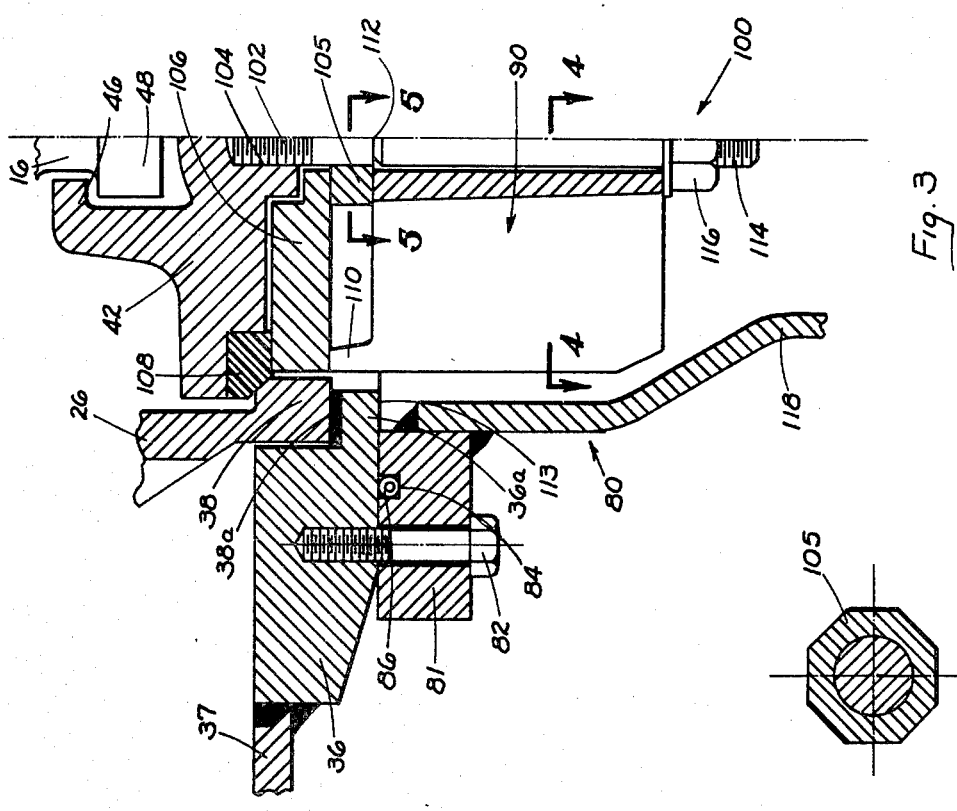
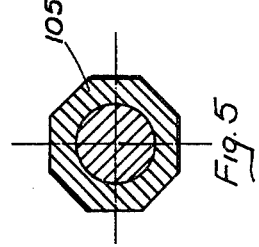

POSITIVE CLAPPER OUTLET VALVE

BACKGROUND OF THE INVENTION AND DESCRIPTION OF THE PRIOR ART

In a previous top operated railway tank car lading valve assembly, a rod 10 (FIGS. 1 and 2) extends to the top of a railway tank car (not shown) and is rotated at the top of the tank in a known manner. The rod 10 is attached to a sleeve 12 with a pin 14 in a known manner. The stem is externally threaded at 16 and engages a sleeve 18 which is internally threaded as indicated at 20. The sleeve 18 includes a slot 22 which engages a flange portion 24 of a valve cage 26. In addition, a keeper 30 holds the sleeve 18 in engagement with the cage 26 by means of a horizontally extending pin 32 as shown in FIG. 2.

Fasteners 34 having nuts 35 extend through the cage 26 and into a tank car bottom outlet mounting flange indicated at 36 welded to the tank bottom 37. The cage 26 includes a valve seat 38 having an inclined seat surface 40. A valve seal 38a is located between cage 26 and flange 36a. A valve closure 42 includes a retaining portion 44 having a formed slot 46 which engages the lower end 48 of the valve stem 16.

The valve closure 42 further includes a slot 52 into which is placed a seal 54. A depending valve guide 56 is held in place with a threaded pin 58 which threadably engages the valve as indicated at 60 and is held in place with a nut 62. The guide 56 also maintains the seal 54 in place.

As is conventional, the outlet chamber 70 is attached to flange 36 with fasteners 71. A tongue 72 engages a slot 73 containing a seal 74. The outlet chamber includes a hollow lading discharge portion 75 which is closed by a cap 76 which includes a removable plug 77. Cap 76 is adapted to receive a suitable chain 78 to prevent the loss of the cap as is known in the art. A breakage groove 79 may also be provided between the cap and the bottom of the hollow chamber 75.

However, with this arrangement, since the valve guide 56 extends downwardly into the outlet chamber 70 in excess of one (1) inch, and since the outlet chamber 70 has not been designed to shear off upon impact, a skid is required with this construction to comply with AAR and DOT requirements concerning projections extending below the tank bottom.

SUMMARY OF THE INVENTION

In accordance with the present invention, a top operated tank car valve assembly includes a rod extending downwardly from the top of the tank and is attached to a valve stem of a lading valve located in the bottom of the tank. The stem engages a threaded valve sleeve provided with a mounting flange which engages a cooperating mounting flange on a valve cage. Fasteners engage the upper surface of the sleeve, and extend through the valve cage and engage threaded openings in a tank car bottom outlet mounting flange. A valve seat for a valve closure is located in an opening in the bottom outlet mounting flange. Circumferentially spaced openings are formed in the valve cage for lading flow. A valve stem retainer includes a cavity or opening into which is inserted the lower end of the valve stem. A valve guide depends from the valve closure.

The valve guide includes a center hub and a plurality of vanes extending radially outwardly therefrom and adapted to engage the valve cage as the valve is moved between open and closed positions. The center hub is hollow and is adapted to receive a fastener to attach the valve guide to the valve closure. The fastener includes a threaded inner end to engage the lower portion of the valve closure. A non-round horizontal plate is welded to the fastener which holds a seal retainer in engagement with a seal and the valve closure. A breakage groove is provided in the fastener below the non-round plate which aligns with the upper surface of the valve guide. An outlet chamber is attached to the tank mounting flange with shearable fasteners. The breakage groove aligns with the mounting flange and outlet chamber interface.

If the outlet chamber is impacted, the outlet chamber fasteners and valve guide fastener will shear along a common plane and the outlet chamber and valve guide will be separated from the outlet. However, the non-round horizontal plate located above the shear plane will maintain the seal retainer and the closure seal in place on the valve seat. Thus lading will be prevented from escaping from the tank during such impacts. The valve closure can be moved to open position by the operator at the top of the tank. Since the plate is non-round in shape, a non-round tool can readily remove the remaining end of the valve guide fastener after the lading has been removed.

THE DRAWINGS

FIG. 2 is a horizontal sectional view looking in the direction of the arrows along the line 2—2 in FIG. 1;

FIG. 3 is an enlarged vertical sectional view illustrating the shearable valve guide fastener and outlet chamber of the present invention;

FIG. 4 is a sectional view looking in the direction of the arrows along the line 4—4 in FIG. 3; and FIG. 5 is a sectional view looking in the direction of the arrows along the line 5—5 in FIG. 3.

DETAILED DESCRIPTION OF THE INVENTION

Figure 1:
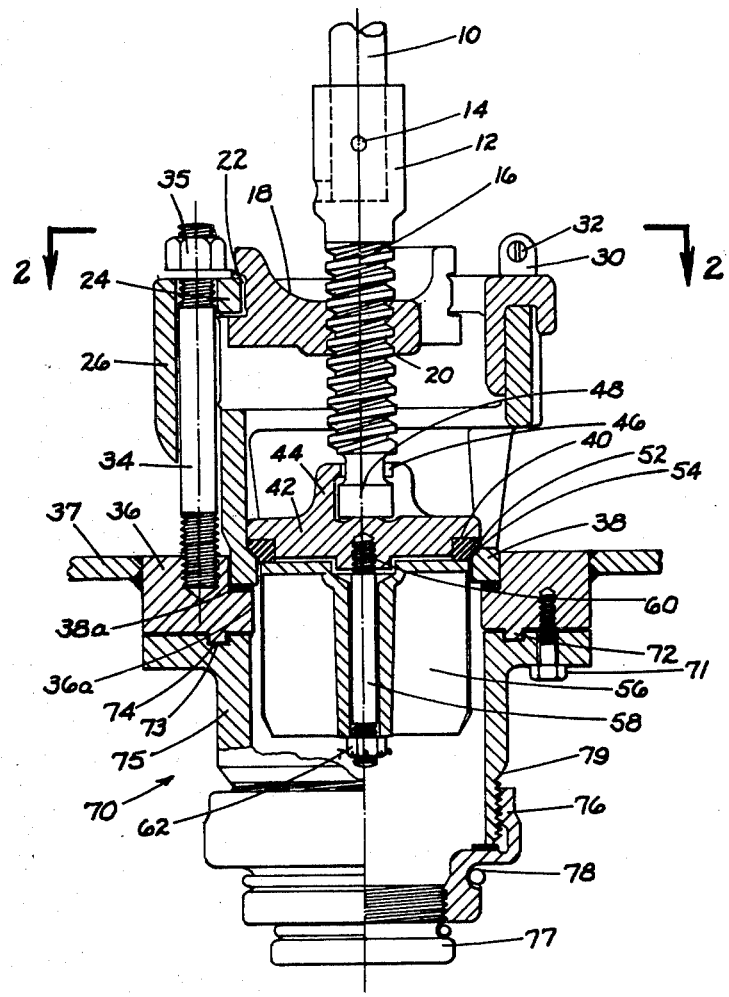
FIG. 1 is a vertical sectional view of a prior art top operated valve assembly.

In accordance with the present invention, as shown in FIG. 3, an outlet chamber 80 is attached to the tank car mounting flange 36 with shearable fasteners 82. The fasteners may be rendered shearable by virtue of their material and cross section. Alternatively, a groove, not shown, may be provided to render the fasteners shearable. A slot 84 is provided in the outlet chamber flange which receives an O-ring seal 86. The outlet chamber is otherwise constructed in the same manner as outlet chamber 70.

A valve guide indicated generally at 90 (FIG. 4) includes a hollow hub 92 having an opening 93 and a plurality of radially extending vanes 94. The vanes are adapted to engage the valve cage 26 as the valve closure 42 moves between open and closed positions. A valve guide fastener indicated generally at 100 includes an inner threaded end 102 adapted to be inserted within a threaded opening 104 within the valve closure 42. A non-round plate 105 is welded to the valve guide fastener and engages a seal retainer 106 which holds in place a closure seal 108 which in closed position engages the valve seat 38. Furthermore, the valve guide vanes 94 include upper distal end portions 110 which engage the outer periphery of the seal retainer 106.

A breakage groove 112 is provided in the valve guide fastener below the horizontal plate 104. This breakage groove is designed to align with the plane 113 between the tank car mounting flange 36 and the outlet chamber mounting flange 81. The opposite end 114 of the valve guide fastener is threaded and is adapted to receive a fastening nut 116 which holds the valve guide 90 in place. The valve closure 42 may be moved to open position in a conventional manner by rotation of the rod 10 at the top of the car.

In the event that the outlet chamber is impacted in transit, either on the track or in a derailment, the outlet chamber 80 and the breakage groove will shear off along the common plane 113. Thus, the outlet chamber and the valve guide 90 will be separated from the outlet assembly. In all likelihood, distal end portion 110 of the valve guide will separate from seal retainer 106. However, non-round plate 105 located above breakage groove 112 will maintain seal retainer 106 and seal 108 in place on valve seat 38. Thus, the lading will not escape as a result of such an impact.

After removal of the lading by rotation of rod 10 from the top of the car, a suitable non-round tool having an opening corresponding to the non-round shape of plate 105 may be utilized to remove seal retainer 106 and the remainder of valve guide fastener 100.

What is claimed is

1. A top operated tank car valve assembly comprising: a rod extending downwardly from the top of the tank and attached to a valve stem of a lading valve closure located in the bottom of the tank; a valve guide depending from said valve closure; said valve guide including a center hub and a plurality of vanes extending radially outwardly therefrom and adapted to engage a valve cage as the valve is moved between open and closed positions; said center hub being hollow and adapted to receive a fastener to attach the valve guide to said valve closure; said fastener including a threaded inner end to engage the lower portion of the valve closure; a non-round horizontal plate attached to the fastener which holds a seal retainer in engagement with a seal and the valve closure; an outlet chamber attached to a tank mounting flange with shearable fasteners; a breakage groove provided in said fastener; said breakage groove aligning with the mounting flange and outlet chamber interface; whereby, if the outlet chamber is impacted, the outlet chamber fasteners and valve guide fastener will shear along a common plane and the outlet chamber and valve guide will be separated from the outlet; and whereby the horizontal plate located above the shear plane will maintain the seal retainer and the closure seal in place on the valve seat, and lading will be prevented from escaping from the tank during such impacts.

2. A top operated tank car valve assembly according to claim 1 wherein said breakage groove aligns with the upper surface of said valve guide.

3. A top operated tank car valve assembly comprising: a rod extending downwardly from the top of the tank and attached to a valve stem of a lading valve closure located in the bottom of the tank; said stem engaging a threaded valve sleeve provided with a mounting flange which engages a cooperating mounting flange on a valve cage; fasteners engaging the upper surface of the sleeve, and extending through the valve cage engaging threaded openings in a tank car bottom outlet mounting flange; a valve seat for said lading valve closure located in an opening in the bottom outlet mounting flange; circumferentially spaced openings located in the valve cage for lading flow into said opening; the lower end of the valve stem engaging a valve stem retainer extending above said valve closure; a valve guide depending from said valve closure; said valve guide including a center hub and a plurality of vanes extending radially outwardly therefrom and adapted to engage a valve cage as the valve is moved between open and closed positions; said center hub being hollow and adapted to receive a fastener to attach the valve guide to said valve closure; said fastener including a threaded inner end to engage the lower portion of the valve closure; a non-round horizontal plate attached to the fastener which holds a seal retainer in engagement with a seal and the valve closure; an outlet chamber attached to said tank mounting flange with shearable fasteners; a breakage groove provided in said fastener; said breakage groove aligning with the mounting flange and outlet chamber interface; whereby, if the outlet chamber is impacted, the outlet chamber fasteners and valve guide fastener will shear along a common plane and the outlet chamber and valve guide will be separated from the outlet; and whereby the horizontal plate located above the shear plane will maintain the seal retainer and the closure seal in place on the valve seat, and lading will be prevented from escaping from the tank during such impacts.

4. A top operated tank car valve assembly comprising: a rod extending downwardly from the top of the tank and attached to a valve stem of a lading valve closure located in the bottom of the tank; a movable valve guide depending from said valve closure; said movable valve guide including a center hub and a plurality of vanes extending radially outwardly therefrom and adapted to engage a fixed valve guide as the valve closure is moved between open and closed positions; said center hub being hollow and adapted to receive a valve guide fastener to connect said movable valve guide to said valve closure; fastening means for connecting said valve guide fastener to the lower portion of said valve closure; a non-round horizontal plate attached to the fastener which holds a seal retainer in engagement with a seal and the valve closure; an outlet chamber attached to a tank mounting flange with shearable fasteners; a breakage groove provided in said valve guide fastener; said breakage groove aligning with the mounting flange and outlet chamber interface; whereby, if the outlet chamber is impacted, the outlet chamber fasteners and said valve guide fastener will shear along a common plane and the outlet chamber and valve guide will be separated from the outlet; and whereby the horizontal plate located above the shear plane will maintain the seal retainer and the closure seal in place on the valve seat, and lading will be prevented from escaping from the tank during such impacts.

5. A top operated tank car valve assembly according to claim 4 wherein said breakage groove aligns with the upper surface of said valve guide.

* * * * *